T. A. TUCKER.
AUTOMATIC DEVICE FOR CUTTING OFF THE FLOW OF AIR THROUGH OIL PIPES.
APPLICATION FILED MAR. 19, 1915.
1,176,107.
Patented Mar. 21, 1916.
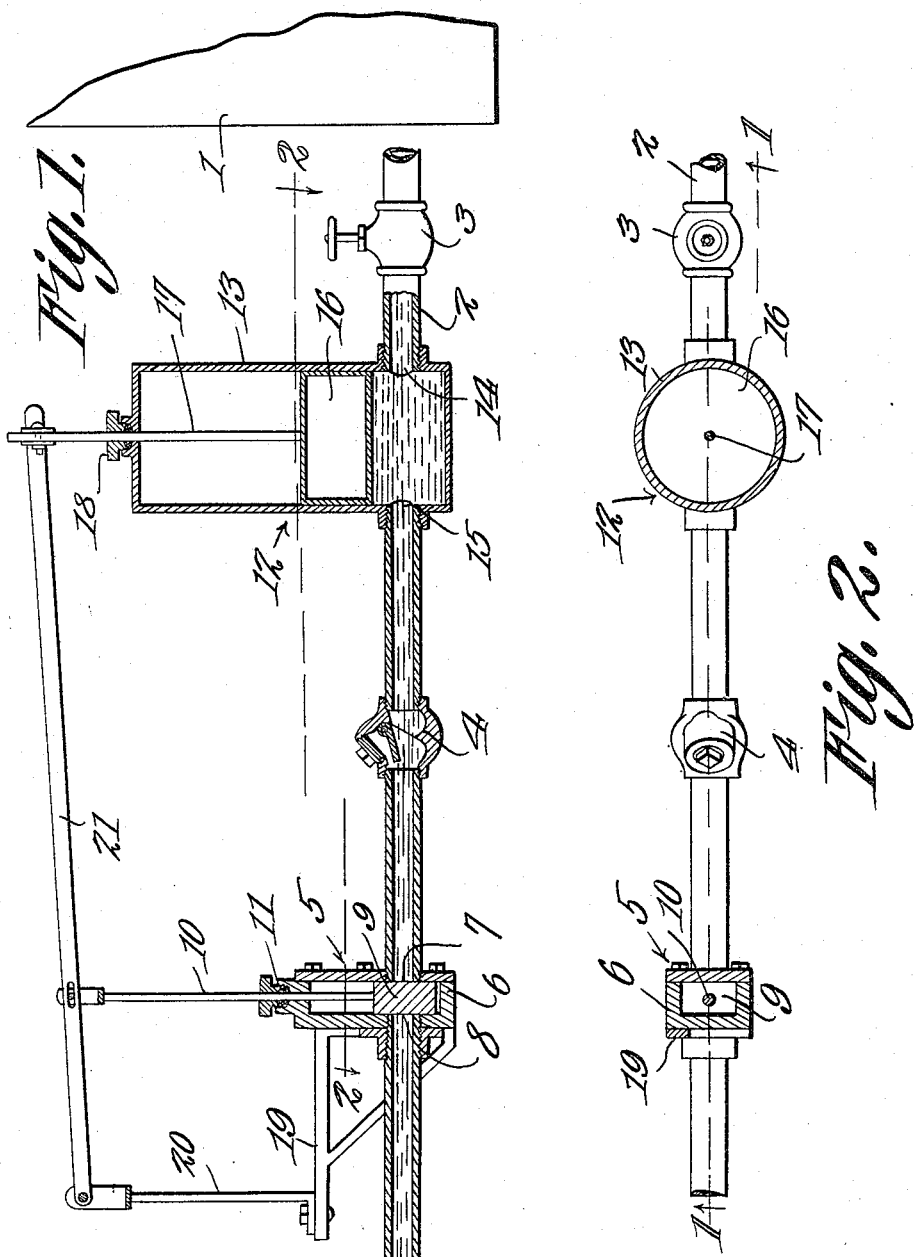

UNITED STATES PATENT OFFICE.

THOMAS A. TUCKER, OF BURKBURNETT, TEXAS.

AUTOMATIC DEVICE FOR CUTTING OFF THE FLOW OF AIR THROUGH OIL-PIPES.

1,176,107. Specification of Letters Patent. Patented Mar. 21, 1916.

Application filed March 19, 1915. Serial No. 15,600.

*To all whom it may concern:*

Be it known that I, THOMAS A. TUCKER, a citizen of the United States, residing at Burkburnett, in the county of Wichita and State of Texas, have invented a new and useful Automatic Device for Cutting Off the Flow of Air Through Oil-Pipes, of which the following is a specification.

The present invention appertains to a device for cutting off the flow of air through oil pipes, and aims to provide a novel and improved device of that character which will operate automatically to shut off the flow of air through the pipe line as when the oil is pumped from a storage tank and reaches the level of the pipe, which would ordinarily allow air to be drawn into the trunk or main line.

It is the object of the invention to provide a unique device, which is comparatively simple and inexpensive in construction, which may be readily applied to an oil pipe or line, and which is operable in an efficient and practical manner for automatically closing the passage through the pipe when the tank is emptied to prevent air from entering the pipe.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a vertical section of the device as applied to an oil pipe, the section being taken on line 1—1 of Fig. 2. Fig. 2 is a horizontal section taken on the line 2—2 of Fig. 1.

In the drawing, the numeral 1 designates a tank for the storage of oil therein, such as is used in the oil districts, and the numeral 2 designates the oil pipe or line connected to the lower portion of the tank 1. This pipe 2 has a controlling valve 3 interposed therein adjacent the tank 1 whereby the valve 3 may be readily operated for opening and closing the pipe. The pipe 2 is also equipped with a check valve 4 which allows the oil to flow out of the tank through the pipe, but which prevents the back flow of oil within the pipe 2.

In carrying out the invention, a cut off valve structure 5 is interposed in the pipe 2, preferably beyond the check valve 4, and embodies an upright or upwardly projecting rectangular casing 6 whose sections or sides are provided with inlet and outlet ports 7 and 8, respectively, adjacent the lower end of the casing 6 and into which ports, the sections of the pipe 2 are threaded or engaged, whereby the oil will flow through the casing 6 when it flows through the pipe 2. A gate valve 9 is mounted for reciprocation within the casing 6 and when lowered closes the ports 7 and 8, and thereby cuts or shuts off the flow of oil and air through the pipe 2. The gate valve 9 is provided with an upwardly projecting stem 10 slidable through the upper end of the casing 6, and suitable packing means 11 being carried by the upper end of the casing 6 for embracing the stem or rod 10 to prevent leakage.

A mechanism is employed for automatically operating the gate valve 9, this device being designated generally by the numeral 12, and embodies an upright or upstanding casing 13 having the diametrically opposite inlet and outlet ports 14 and 15, respectively, adjacent its lower end, and into which the adjacent ends of the respective sections of the pipe 2 are threaded or otherwise engaged. Thus, the oil will flow into and through the casing 13 when the valve 3 is opened. Mounted for vertical movement within the casing 13 is a float 16, which has attached thereto an upstanding rod or stem 17 which slides through the upper end of the casing 13, the upper end of the casing having suitable packing means 18 for embracing the rod 17 to prevent leakage.

The valve stem 10 and float rod 17 are operatively connected, whereby the movement of the float will actuate the gate valve 9, and to this end, an outstanding bracket 19 is attached to the back of the casing 6 and carries a standard 20, to the upper end of which an actuating lever 21 is fulcrumed. The actuating lever 21 is of the second order and has one end fulcrumed to the standard 20 while its other end is connected loosely to the upper end of the float rod 17, the upper end of the valve stem 10 being connected loosely to the lever between its ends.

In operation, supposing the tank 1 to be filled with oil, and the valve 3 is opened, the oil will be allowed to flow into the casing 13, and the casing 13 will then be filled with oil, which will raise the float 16, and as a consequence, the actuating lever 21 will be raised, resulting in the upward movement of the gate valve 9. As a result, the gate valve 9 will be lifted away from the ports 7 and 8 of the valve casing 6, and this will allow the oil to flow past the gate valve into the trunk or main line of the system, the oil being pumped in the usual manner from the tank into the trunk or main line. Now, supposing that the oil level within the storage tank 1 has lowered to the pipe 2, this would ordinarily allow the air to be drawn through the pipe 2, which is objectionable for obvious reasons. However, with the present device, as soon as the tank is emptied, the oil within the casing 13 will also reach a lower level, thus permitting the float 16 to gravitate, and causing the lever 21 to be swung downwardly. The lever 21 being lowered will swing the gate valve 9 downwardly, to cut off the flow of oil and air through the pipe 2. In this manner, as soon as the tank is emptied, the cut off valve structure 5 will automatically close, which is a notable feature of the present mechanism.

Although the present device has been illustrated and described as being applied to an oil pipe, it is evident that it may be applied to other liquid pipes, for shutting off the flow of liquid through the pipe, when air or other gas is allowed to enter the pipe.

The casing 13 is preferably disposed between the valves 3 and 4 of the pipe 2, and at any rate between the valve structure 5 and the tank 1.

Having thus described the invention, what is claimed as new is:

1. In a device of the character described, a pipe, a controlling valve therefor, a cut off valve interposed in said pipe, a casing interposed in said pipe, a float movable in said casing, means operatively connecting the float and cut off valve whereby when the float is raised and lowered it will open and close the cut off valve, respectively.

2. In a device of the character described, a pipe, a controlling valve therefor, a cut off valve structure embodying a casing interposed in said pipe and a vertically movable gate valve within said casing, the cut off valve having a stem slidable through the upper end of the casing, a float casing interposed in said pipe, a vertically movable float in the float casing and having a rod slidable through the upper end of the float casing, and a lever operatively connecting said stem and rod, whereby when the float is raised and lowered it will open and close the gate valve, respectively.

In testimony that I claim the foregoing as my own, I have hereto affixed my signature in the presence of two witnesses.

THOMAS A. TUCKER.

Witnesses:
F. N. LAWSON,
MARTIN L. ALLDAY.

Copies of this patent may be obtained for five cents each, by addressing the "Commissioner of Patents, Washington, D. C."